(12) United States Patent
Wenger et al.

(10) Patent No.: US 8,393,780 B2
(45) Date of Patent: *Mar. 12, 2013

(54) SCREW ASSEMBLY FOR COOKING EXTRUDERS OPERATING WITH SIGNIFICANTLY REDUCED SPECIFIC MECHANICAL ENERGY INPUTS

(75) Inventors: LaVon Wenger, Sabetha, KS (US); Marc Wenger, Sabetha, KS (US); Galen J. Rokey, Sabetha, KS (US); Allan C. Spellmeier, Fairview, KS (US)

(73) Assignee: Wenger Manufacturing, Inc., Sabetha, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/284,665

(22) Filed: Oct. 28, 2011

(65) Prior Publication Data

US 2012/0092952 A1 Apr. 19, 2012

Related U.S. Application Data

(63) Continuation of application No. 12/980,018, filed on Dec. 28, 2010, now abandoned, which is a continuation of application No. 12/208,517, filed on Sep. 11, 2008, now abandoned.

(51) Int. Cl.
*B29B 7/48* (2006.01)
(52) U.S. Cl. .............................. 366/85; 366/88; 366/301
(58) Field of Classification Search .............. 366/79–90, 366/323, 301; 425/200–209
See application file for complete search history.

(56) References Cited

U.S. PATENT DOCUMENTS

| | | | | |
|---|---|---|---|---|
| 3,085,288 | A * | 4/1963 | Street | 366/85 |
| 4,363,671 | A * | 12/1982 | Rugg et al. | 127/1 |
| 4,600,311 | A * | 7/1986 | Mourrier et al. | 366/88 |
| 5,486,366 | A * | 1/1996 | Song et al. | 426/5 |
| 5,891,502 | A | 4/1999 | Heck et al. | |
| 6,382,826 | B1 * | 5/2002 | Della Rossa | 366/85 |
| 7,521,076 | B1 * | 4/2009 | Wenger et al. | 426/510 |
| 7,749,552 | B1 * | 7/2010 | Plattner et al. | 426/623 |
| 7,987,774 | B2 * | 8/2011 | Wenger et al. | 99/353 |
| 8,177,414 | B1 * | 5/2012 | Wenger | 366/155.2 |
| 8,246,240 | B2 * | 8/2012 | Wenger | 366/156.1 |
| 8,277,866 | B2 * | 10/2012 | Plattner et al. | 426/618 |
| 8,322,272 | B1 * | 12/2012 | Wenger | 99/353 |
| 2008/0223223 | A1 * | 9/2008 | Wenger et al. | 99/447 |
| 2010/0062093 | A1 * | 3/2010 | Wenger et al. | 425/113 |
| 2011/0086150 | A1 * | 4/2011 | Plattner et al. | 426/549 |
| 2011/0086151 | A1 * | 4/2011 | Plattner et al. | 426/550 |
| 2011/0091627 | A1 * | 4/2011 | Wenger et al. | 426/510 |
| 2012/0092952 | A1 * | 4/2012 | Wenger et al. | 366/301 |
| 2012/0171346 | A1 * | 7/2012 | Plattner et al. | 426/549 |

FOREIGN PATENT DOCUMENTS

DE 19512230 A1 * 12/1995
FR 2563462 A1 * 10/1985

* cited by examiner

*Primary Examiner* — Charles E Cooley
(74) *Attorney, Agent, or Firm* — Hovey Williams LLP

(57) ABSTRACT

Screw assemblies are provided for cooking extruders characterized by operation using significantly reduced specific mechanical energy inputs, wherein the screw assemblies include first and second elongated, axially rotatable screws which are substantially coextensive in length, with the screw flighting presenting a pair of axially spaced apart sections of short pitch length and an intermediate section of greater pitch length. The intermediate section has an axial length greater than about four times the length of the axially spaced apart sections. The screw assemblies permit incorporation of significantly greater amounts of steam into comestible products during cooking thereof, as compared with prior art designs.

10 Claims, 4 Drawing Sheets

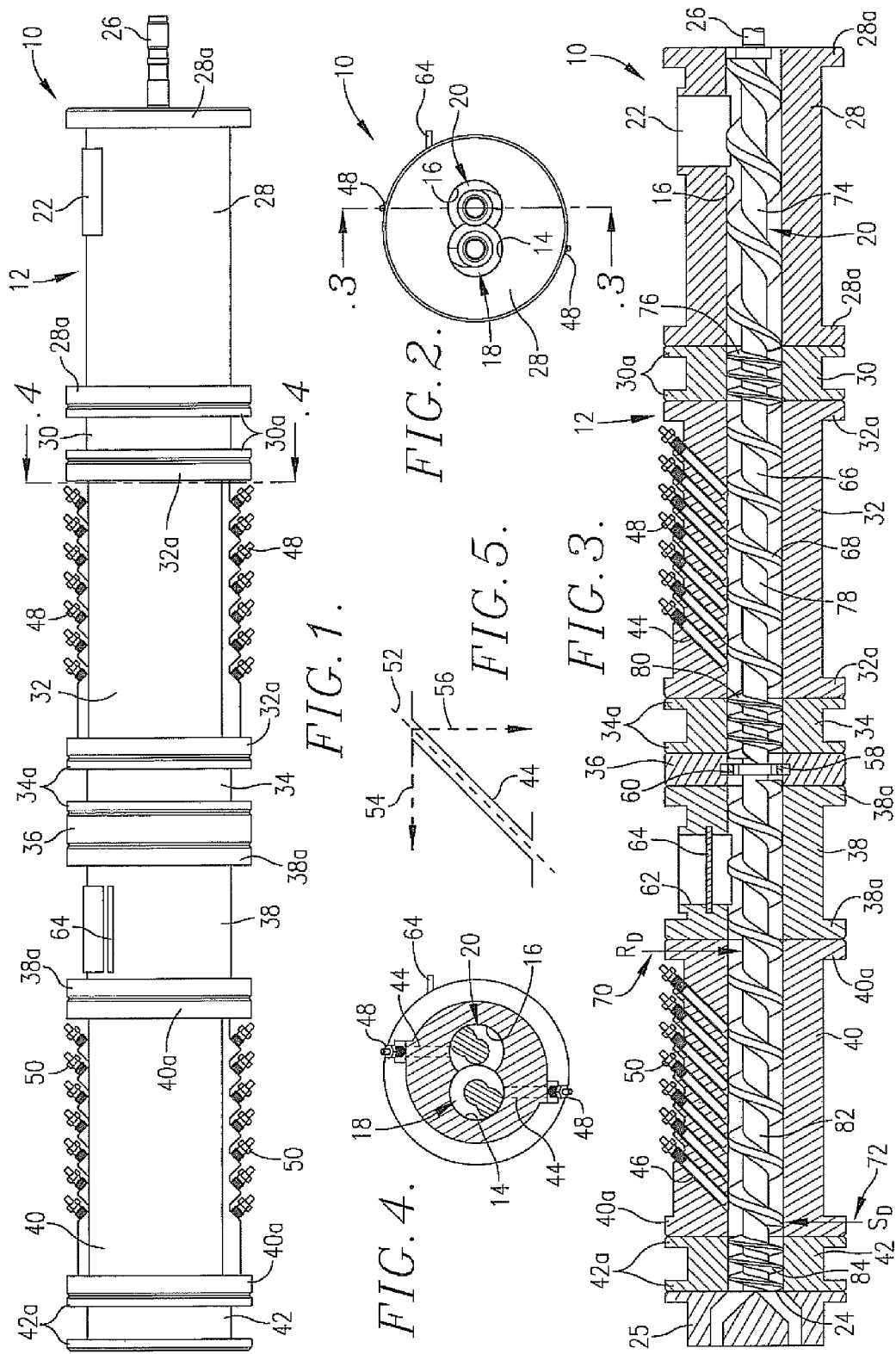

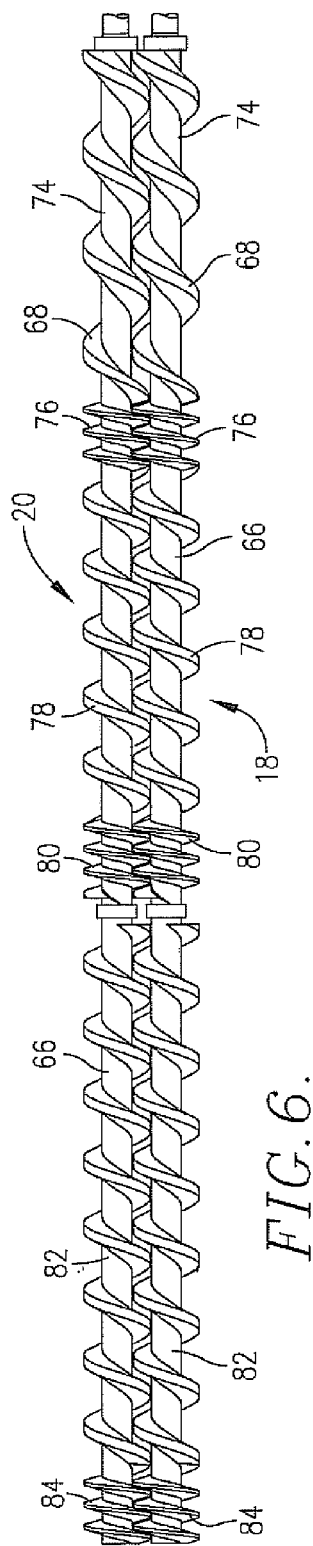
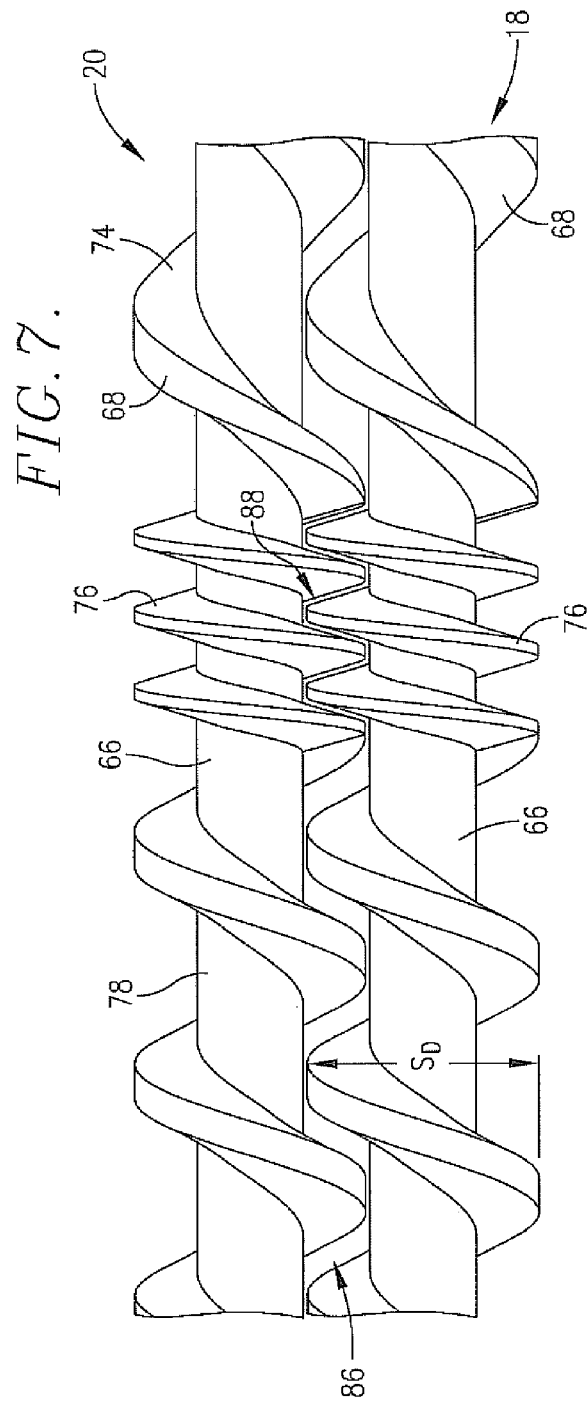
FIG. 6.
FIG. 7.

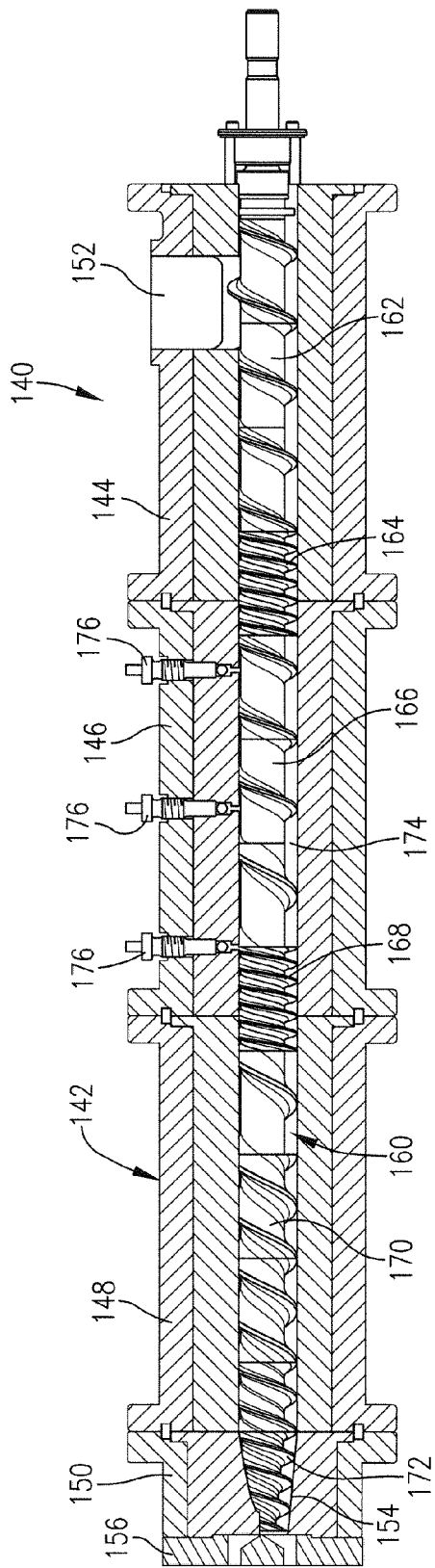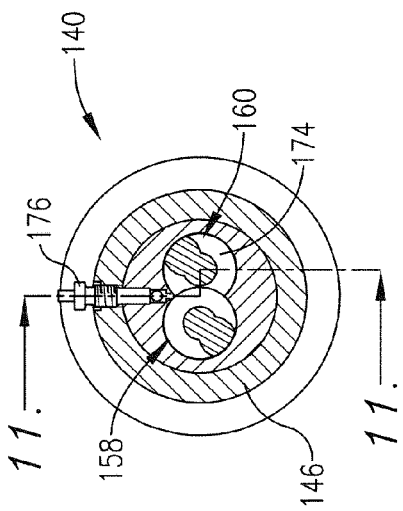
FIG. 11.
PRIOR ART
FIG. 10.
PRIOR ART

US 8,393,780 B2

SCREW ASSEMBLY FOR COOKING EXTRUDERS OPERATING WITH SIGNIFICANTLY REDUCED SPECIFIC MECHANICAL ENERGY INPUTS

CROSS-REFERENCE TO RELATED APPLICATION

This is a continuation of application Ser. No. 12/980,018 filed Dec. 28, 2010, now abandoned, which is a continuation of Ser. No. 12/208,517 filed Sep. 11, 2008, now abandoned, both of which are incorporated hereby by reference in their entireties.

BACKGROUND OF THE INVENTION

1. Field of the Invention

The present invention is broadly concerned with improved extruders and methods for extrusion processing of comestible products with very low specific mechanical energy (SME) inputs as compared with conventional methods. More particularly, the invention is concerned with extruders having specially configured screws designed to permit addition of very high quantities of steam, so that the amount of SME required to for complete cooking is maritally reduced. The resultant feeds have very high cook values and expansion characteristics.

2. Description of the Prior Art

Extrusion processing of comestible products such as human foods and animal feeds has long been practiced and is a highly developed art. In general terms, food extruders of the single or twin screw variety are employed, having elongated, tubular barrels with inputs adjacent one end thereof and restricted orifice dies at the outlet thereof, and one or two helically flighted, rotatable screws within the barrel. In many instances steam is injected into the barrel during processing, conventionally by means of injectors oriented at a perpendicular angle relative to the longitudinal axis of the barrel. Depending upon the selected extrusion conditions, the final products may be fully or partially cooked, and can have varying degrees of expansion. This requires a total energy input into the materials being processed, which usually has two components, energy derived from steam injection (specific thermal energy, STE) and SME. It is well known in the art that SME input is significantly more expensive than STE input (generally 2-2.5 times more expensive), and accordingly reducing the extent of SME input required to produce a given product would be very attractive from an economic point of view.

Conventional extrusion systems are limited in the amount of steam which can be injected into the extruder barrel, typically no more than about 5% by weight. This in turn means that SME input must be increased to provide the necessary energy input required. Consequently, the extrusion equipment must have a more robust and therefore construction than would otherwise be necessary, the extent of extruder component wear is higher than desirable, and utility costs are increased.

One factor influencing SME inputs in extrusion processes is the flight depth ratio of the extruder screw(s). This is the ratio of the outer diameter of the screw ($S_D$) to the root diameter of the screw ($R_D$). The flight depth ratio largely determines the shear and volume of output from an extruder. Typical cooking extruders in use today have a flight depth ratio in the range of 1.3 to 1.8. Skilled artisans understand that a ratio of 1.3 is too small, in that the screw(s) lack free volume, creates excessive shear inputs and consumes too much power. Similarly, a ratio above 1.8 is deemed too large, in that the screw has too much free volume and which will prevent barrel fill and the ability to achieve a desired cook value. Accordingly, a flight depth ratio of 1.5-1.6 is considered to be the best compromise. For example, the Wenger TX85 twin-screw extruder has a flight depth ratio of 1.574.

Another geometrical consideration is the ratio of the pitch of the extrusion screw(s) to the flight depth ratio. Smaller values of this ratio for a given pitch translate into lower exit temperatures, increased mechanical efficiency (i.e., more product throughput for a given power input), and greater outputs. The Wenger TX85 extruder with 1.5 pitch screws has a pitch/$S_D$/$R_D$ of 0.953, and with 0.5 pitch screws, the value is 0.317.

It is also the general practice in the extrusion art to position adjacent, intermeshed twin screws in a close, self-wiping orientation. Any significant axial gap or clearance between the adjacent flighting sections is considered to be detrimental in that it could create dead zones of accumulated product, and also would decrease the extent of product mixing within the extruder barrel. For example, the Wenger TX85 has an axial gap of 0.039 inches between the adjacent flighting, and this is in keeping with the conventional wisdom of extruder design.

Generally, designers of extruders follow these guidelines in order to achieve what is thought to be the best compromise between extruder size and utility costs on the one hand, versus the need to provide fully cooked and expanded products on the other. That is, an extruder can be designed with smaller drives and screw geometries which will minimize SME. However, these types of extruders will be deficient in that cook values will be unacceptably low and significant expansion cannot be achieved. Alternately, an aggressive extruder design can be used, which will assure adequate cook and expansion of products, but this will inevitably result in high shear and SME inputs with resultant higher costs.

There is accordingly a need in the art for improved extruder equipment and methods which achieve the seemingly contradictory goals of low capital and utility costs with reduced SME inputs, while at the same time being capable of producing fully cooked and expanded products of high quality.

SUMMARY OF THE INVENTION

The present invention overcomes the problems outlined above and provides improved, low-SME input extruders and corresponding methods for the production of fully cooked comestible extrudate products such as human foods or animal feeds. Broadly speaking, the invention provides a method of extruding a material using a cooking extruder (preferably a twin screw extruder) having an elongated, tubular barrel with an inlet and an outlet and presenting a longitudinal axis, a restrictive orifice die plate disposed across the outlet, and an elongated, axially rotatable, helically flighted screw within the barrel. The method comprises the steps of passing a starting material into the barrel inlet and rotating the screw to convey the material along the length thereof toward and through the die plate while imparting an SME input into the material. During passage of the material through the barrel, at least one zone is created within the barrel having free volume not occupied by the material (i.e., there is a free volume within the zone). Steam is injected into the free volume zone of the barrel at an oblique angle (preferably from about 30-60°) relative to the barrel longitudinal axis, and the injected steam is mixed with the material being processed. The amount of injected steam is in excess of 6% by weight steam (more preferably at a level from about 7-25% by weight), based upon the total dry weight of the starting material taken as 100% by weight. As a consequence of these high injected steam levels, the SME input is significantly lessened, and is up to about 22 kWhr/T (more preferably from about 5-22 kWhr/T). The extruded products are normally highly cooked, exhibiting a cook value of at least 75%, more preferably from about 75-98%.

In more particular aspects of the invention, substantially fully cooked comestible products selected from the group consisting of pet feeds and aquatic feeds are fabricated using SME input levels of up to about 18 kWhr/T (more preferably from about 10-18 kWhr/T) for pet feeds, and SME input levels of up to about 16 kWhr/T (more preferably from about 8-16 kWhr/T) for aquatic feeds. The methods of the invention can be controlled for giving desired expansions of the final products. Expansions of up to about 50%, more preferably from about 15-35% can readily be achieved.

The invention allows extrusion equipment to be produced at lower cost, owing to the fact that acceptable products can be produced with lower SME inputs. That is, the equipment may be made with smaller motors and drives than would otherwise be necessary. The internal extruder components such as barrels, linings, and screws are also subjected to less wear. Furthermore, utility costs are reduced in as much as energy inputs derived from steam are much less expensive than those from SME.

The preferred extruders of the invention are twin-screw extruders wherein the screw assemblies are of a special and unique design. The screw assemblies include first and second elongated, axially rotatable screws each having an elongated shaft with outwardly extending helical flighting along the length of each shaft and with the flighting of each shaft being intermeshed with the flighting of the other shaft. Each flighting presents a pair of axially spaced apart sections of short pitch length, and an intermediate section between the short pitch length sections and having a pitch length greater than the pitch lengths of either of the short pitch length sections. Also, the flighting of the intermeshed intermediate sections has a very large axial gap distance therebetween of from about 0.1-0.4 inches. This has been shown to enhance distributive mixing of the material being processed within the extruder barrel.

Other features of the preferred screw assemblies include the ratio of the pitch length of the intermediate, long pitch length section to the pitch lengths of either of the first and second short pitch length sections. This ratio should be from about 1-7. Additionally, the ratio of the pitch length of the intermediate section to the flight depth ratio should be from about 0.4-0.9. These features, particularly in combination, allow for very high barrel steam injection without blowback through the barrel inlet and with complete mixing of the injected steam into the material being processed. Consequently, an increased proportion of the total energy input needed to fully cook and expand the extrudate is derived from steam rather than SME.

BRIEF DESCRIPTION OF THE DRAWINGS

FIG. 1 is a side elevational view of a cooking extruder in accordance with the invention, equipped with obliquely oriented steam injection ports and injectors;

FIG. 2 is a front end view of the cooking extruder depicted in FIG. 1;

FIG. 3 is a vertical sectional view taken along line 3-3 of FIG. 2;

FIG. 4 is a vertical sectional view taken along line 4-4 of FIG. 1;

FIG. 5 is a schematic illustration of an orthogonal resolution of the longitudinal axis of one of the extruder barrel injection ports, illustrating the resolution components;

FIG. 6 is a plan view of a pair of intermeshed extruder screws for use in the preferred twin screw extruder of the invention;

FIG. 7 is an enlarged, fragmentary view of portions of the screws of FIG. 6, illustrating the pitches and clearances between sections of the screws;

FIG. 10 is a vertical sectional view of a twin screw extruder of a different configuration as compared with the extruder of FIGS. 1-4, having steam injection ports and injectors located along the intermeshed region of the extruder screws and oriented perpendicularly relative to the longitudinal axes of the extruder screws; and FIG. 11 is a vertical sectional view taken along line of 11-11 of FIG. 10.

DETAILED DESCRIPTION OF THE PREFERRED EMBODIMENT

Preferred Extruder

Figures 8, 9:
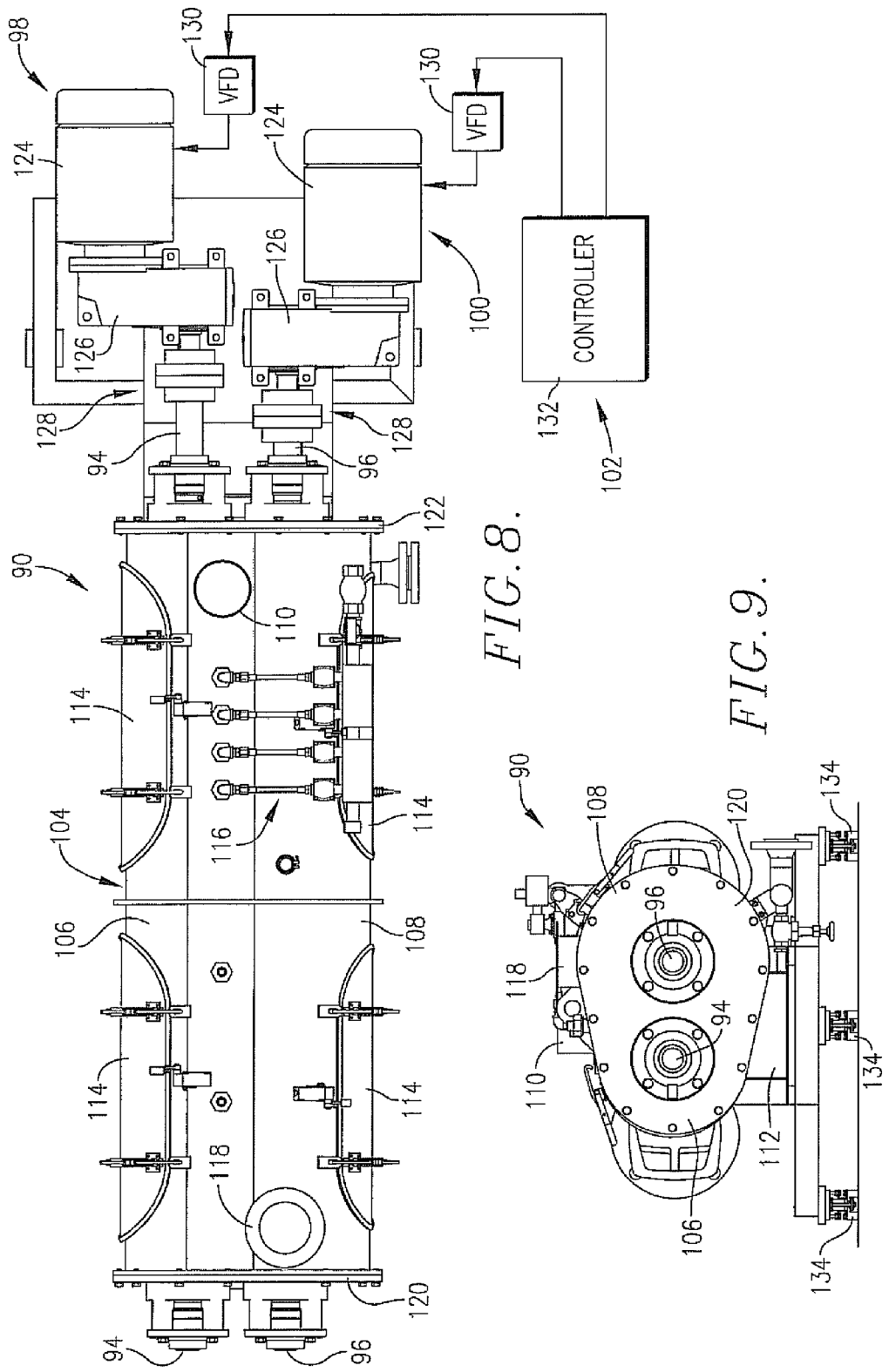
FIG. 8 is a somewhat schematic plan view of a preferred preconditioner for use with the extruder of the invention.
FIG. 9 is a front elevational view of the preconditioner of FIG. 6.

Turning now to the drawing, a cooking extruder 10 in accordance with the invention includes an elongated, tubular, multiple-section barrel 12 presenting juxtaposed, intercommunicated chambers or bores 14, 16, and a pair of elongated, helically flighted, axially rotatable, juxtaposed, intercalated screws 18 and 20 within the bores 14, 16. The barrel 12 includes an inlet 22 and a spaced outlet 24 which communicate with the bores 14, 16. A restricted orifice die 25 is positioned across outlet 24 for extrusion purposes and to assist in maintaining pressure within the barrel 12. Additionally, the drive ends 26 of the screws 18, 20 are operably coupled with a drive assembly (not shown) for axially rotation of the screws 18, 20, which typically includes a drive motor and gear reduction assembly.

In more detail, the barrel 12 includes, from right to left in FIGS. 1 and 3, a series of tubular sections connected end-to-end by conventional bolts or other fasteners. Specifically, the barrel 12 has an inlet head 28, a first short steam restriction head 30, a first steam injection head 32, a second short steam restriction head 34, a mid-barrel adjustable valve assembly head 36, an adjustable steam outlet head 38, a second steam injection head 40, and third short steam restriction head 42. As illustrated, each of the heads 28-34 and 38-42 is equipped with endmost, radially enlarged connection flanges 28a-34a and 38a-42a, and all of the heads 28-42 have aligned through-bores which cooperatively form the barrel bores 14 and 16. The head 36 likewise has through bores mating with those of flanges 32a and 38a.

The heads 32 and 40 of barrel 12 are each equipped with two series of steam injection ports 44 or 46, wherein each of the ports houses an elongated steam injector 48 or 50. The two series of ports 44 in head 32 are located so as to respectively communicate with the bores 14 and 16 of the head (see FIG. 4). Similarly, the two series of ports 46 in head 40 also respectively communicate with the bores 14 and 16 of this head.

Importantly, the ports 44 and 46 are oriented at oblique angles relative to the longitudinal axes of the corresponding bores 14 and 16. In practice, the ports are oriented at an angle from about 30-85 degrees, more preferably from about 30-60 degrees and most preferably about 45 degrees, relative to these axes. Moreover, the ports 44, 46 are preferably oriented in a direction toward the outlet 24. More specifically, and referring to FIG. 5, it will be seen that each representative port 44 presents a longitudinal axis 52. If this axis 52 is orthogonally resolved into components 54 and 56, the component 54 extends in a direction toward outlet 24.

The mid-barrel adjustable valve assembly head 36 is of the type described in U.S. patent application Ser. No. 11/279,379, filed Apr. 11, 2006 and incorporated by reference herein. Briefly, the head 36 includes opposed, slidable, flow restriction components 58 and 60, which can be selectively adjusted toward and away from the central shafts of the extruder screws 18 and 20, so as to vary the restriction upon material flow and thus increase pressure and shear within the extruder 10. On the other hand, the steam outlet head 38 has a steam outlet 62 with an adjustable cover 64 permitting selective escape of steam during the course of extrusion. In some instances, a vacuum device (not shown) can be used in lieu of cover 64 for more effective withdrawal of steam and/or reduction in processing pressures.

Attention is next directed to FIGS. 3 and 6-7 which depict the preferred extruder screws 18 and 20. These screws are identical in configuration, are substantially coextensive in lengthh and of single flight design, and are of the co-rotating variety (i.e., the screws rotate in the same rotational direction). It will be seen that each of the screws 18, 20 broadly includes a central shaft 66 with helical flighting 68 projecting outwardly from the shaft 66. The screws 18, 20 are specially designed and have a number of novel features. These features are best described by a consideration of certain geometrical features of the screws and their relationship to each other and to the associated bores 14, 16. In particular, the shafts 66 have a root diameter $R_D$ defined by the arrow 70 of FIG. 3, as well as an outermost screw diameter $S_D$ defined by the screw flighting 68 and illustrated by arrow 72. In preferred practice, the ratio $S_D/R_D$ (the flight depth ratio) of the of the outermost screw diameter to the root diameter is from about 1.9-2.5, and most preferably about 2.35.

The individual sections of each screw flighting 68 also have different pitch lengths along screws 18, 20, which are important for reasons described below. Additionally, along certain sections of the screws 18, 20, there are different free volumes within the bores 14, 16, i.e., the total bore volume in a section of the barrel 12 less the volume occupied by the screws within that section, differs along the length of the barrel 12.

In greater detail, each screw 18, 20 includes an inlet feed section 74, a first short pitch length restriction section 76 within head 30, a first longer pitch length section 78 within head 32, a second short pitch length restriction section 80 within head 34, a second longer pitch length section 82 within heads 38 and 40, and a third short pitch length restriction section 84 within head 42. It will thus be seen that the pitch lengths of screw flighting 68 of screw sections 76, 80, and 84 are substantially smaller than the corresponding pitch lengths of the flighting 68 of the screw sections 78 and 82. In preferred practice, the pitch lengths of screw sections 76, 80, and 84 range from about 0.25-1.0 screw diameters, and are most preferably about 0.33 screw diameters. The pitch length of 78 and 82 range from about 1-2 screw diameters, and are more preferably about 1.5 screw diameters. The ratio of the longer pitch length to the shorter pitch length preferably ranges from about 1.5-7, more preferably from about 3-6, and most preferably about 4.5. As used herein, "screw diameter" refers to the total diameter of a screw including the flighting thereof as illustrated in FIGS. 3 and 7.

The screws 18 and 20 also have very large flight depths as measured by subtracting $R_D$ from $S_D$, and often expressed as the flight depth ratio $S_D/R_D$. This is particularly important in the long pitch sections 78 and 82, where the ratio of the pitch length to the flight depth ratio (pitch length/$S_D/R_D$ is from about 0.4-0.9, more preferable from about 0.5-0.7, and most preferably about 0.638. In the short pitch sections 76, 80 and 84, the ratio of the pitch length to the flight depth ratio is from about 0.1-0.4, more preferably from about 0.15-0.3, and most preferably about 0.213.

The intermeshed longer pitch screw sections 78 and 82 of the screws 18, 20 include a further unique feature, namely the very wide axial spacing or gap 86 between the respective screw sections. Preferably, this gap is from about 0.1-0.4 inches, more preferably from about 0.15-0.35 inches, and most preferably from about 0.236 inches. It should also be noted that the corresponding axial spacing or gap 88 between the shorter pitch screw sections 76 and 84 are much less, on the order of 0.039 inches.

These geometrical features are important in achieving the ends of the invention, and specifically permit incorporation of significantly greater amounts of steam into the material passing through extruder 10, as compared with conventional designs. Furthermore, the extruder is capable of producing fully cooked, highly palatable comestible products having significantly reduced SEM inputs which materially reduce extruder capital and utility costs. In essence, the restriction heads 30 and 34, and 34 and 42, together with the short pitch length screw section 76, 80 and 84 therein, cooperatively create steam flow restriction zones which inhibit the passage of injected steam past these zones. As such, the zones are a form of steam locks. Additionally, provision of the heads 32, 38, and 40 with the longer pitch length screw sections 78 and 82 therein, between the restriction zones, creates steam injection zones allowing injection of greater quantities of steam than heretofore possible. The longer pitch screw sections 78 and 82 result in decreased barrel fill (not necessarily greater free volume), and thus create steam injection zones. An examination of the screws 18, 20 stopped under normal processing conditions reveals that the screw sections 76 and 80 are completely full of material, whereas the longer pitch screw sections 78 and 82 are only partially full. The orientation of the injection ports 44 and 46, and the corresponding injectors 48 and 50 therein, further enhances the incorporation of steam into the material passing through extruder 10.

The longer pitch screw sections 78 and 82 generate excellent conveyance of materials and incomplete fill of material, allowing for the unusually high level of steam injection. Moreover, the combination of the longer pitch lengths and very wide gap 86 create increased leakage flow resulting in gentle kneading of the moistened material within these sections, particularly at relatively high screw speeds of up to 900 rpm. During wet mixing or kneading of steam and water into the material being processed, low shear conditions are maintained, and the material can pass forwardly and rearwardly through the gap 86. At the same time, the gap 86 is small enough to create the desired distributive mixing of steam and water into the material.

This combination of factors within extruder 10 allows significantly greater steam to be injected, as compared with conventional extruder design. In the later case, only about 3-5% steam may be injected, based upon the total dry weight of the material being processed taken as 100% by weight. As used herein, "dry weight" refers to the weight of the ingredient(s) making up the material without added water but including ingredient native water. Attempts to inject greater amounts of steam in conventional extruders normally results in the excess steam simply passing backwardly through the extruder and exiting the barrel inlet. However, in the present invention, in excess of 6% by weight steam may be successfully injected without undue injected steam loss, based upon total weight of dry material within the barrel 12 at any instance taken as 100% by weight. More particularly, testing has shown that up to about 15% by weight steam may be injected, but this limit is primarily based upon steam injection capacities and not any limitations upon the ability of the extruder to accept excess steam. Broadly therefore, the invention permits introduction of from about 7-25% by weight steam, more preferably from about 10-18% by weight, and most preferably from about 11-15% by weight.

It has been found that the extruder of the invention, by permitting incorporation of greater amounts of steam than heretofore believed possible, permits cooking of food or feed products with materially decreased SME inputs. This in turn means that the extruder can be made less expensively, with smaller motors and drive assemblies than would otherwise be required. Furthermore, utility costs are greatly reduced, because of the fact that energy in the form of steam is much less expensive than that derived from mechanical energy.

The invention is especially adapted for the low-SME production of feeds selected from the group consisting of pet feeds (e.g., dog and cat feeds) and aquatic feeds (e.g., floating, slow-sinking, and fast-sinking feeds for fish or other aquatic creatures). In this context, the pet feeds can be produced with an SME input of up to about 18 kWhr/T, and more preferably at a level from about 10-18 kWhr/T. Likewise, the aquatic feeds can be produced with an SME input of up to about 16 kWhr/T, more preferably from about 8-16 kWhr/T.

As more specific examples of the foregoing, the following table sets forth various classes of conventional extrudates and the SME inputs conventionally required to achieve a complete cook during processing.

erably from about 10-16 kWhr/T. In terms of absolute values, the majority of human food or animal feed products can be processed in accordance with the present invention with SME inputs of up to about 22 kWhr/T, more preferably from about 5-22 kWhr/T, and most preferably from about 9-16 kWhr/T.

It well also be understood that the extent of expansion of a given extrudate can greatly influence the amount of total energy input required for production of the product. Thus, a highly expanded product of low density often requires a significantly greater total energy input than otherwise identical products having no or insignificant expansion. Therefore, the contribution of SME to the total energy input would usually be increased in highly expanded products, as compared with denser products.

Although the extruder 10 illustrated in the Figures includes the use of an adjustable valve assembly head 36 and steam outlet head 38, the use of such heads is not required. The head 36 can advantageously be used as a further restriction against steam loss, and the head 38 can be used in instances where mid-barrel steam venting is desired, e.g., where denser products are desired. Further, although not shown, the extruder barrel may be equipped with external jackets for introduction of heat exchange media to indirectly heat or cool the material passing through the extruders.

In the normal use of extruder 10 for cooking of comestible products such as human foods or animal feeds, the following conditions are typical: residence time of the material being processed within the extruder barrel of from about 3-20 seconds, more preferably from about 4-10 seconds; extruder screw speeds of from about 250-900 rpm, more preferably from about 400-800 rpm; maximum temperature of material being processed within the barrel, 100-150° C., more preferably from about 110-125° C.; maximum pressure within the

TABLE 1

| Product Category | Typical Protein Levels (% by wt) | Typical Fat Level (% by wt) | Typical Starch Level (% by wt) | Range of SME Values Required for Processing (kWhr/T) | Extruded Density Ranges (g/l) | Moisture Upon Extrusion (% by wt) |
|---|---|---|---|---|---|---|
| Dog Food | 18-26 | 4-10 | 25-45 | 20-28 | 380-410 | 21-23 |
| Cat Food | 26-34 | 5-11 | 24-36 | 25-35 | 410-440 | 22-24 |
| High Fat Pet Foods | 26-34 | 12-20 | 15-25 | 18-25 | 430-480 | 24-26 |
| Floating Fish Feed | 18-36 | 2-5 | 20-50 | 20-25 | 410-460 | 21-23 |
| Slow-Sinking Fish Feed | 26-45 | 20-40 | 5-15 | 25-40 | 510-570 | 18-22 |
| Fast-Sinking Fish Feed | 26-48 | 18-26 | 10-15 | 18-25 | 600-650 | 26-28 |
| Shrimp Feed | 22-32 | 2-6 | 12-26 | 18-25 | 660-720 | 27-31 |

The products manufactured using the extruder of the invention normally have all of the same characteristics as products conventionally extruded, but with SME inputs reduced by at least about 25%, more preferably from about 25-50% below those of Table 1. Further, the product densities may be 5-10% lower than those set forth in Table 1, and as-extruded moistures may be lessened by 5-15%, if desired.

Thus, dog food products may be produced with SME inputs of from about 8-21 kWhr/T, more preferably from about 10-18 kWhr/T; cat foods at SME inputs of from about 12-27 kWhr/T, more preferably from about 14-20 kWhr/T; high fat pet foods at SME inputs of from about 6-19 kWhr/T, more preferably from about 10-16 kWhr/T; floating fish feeds at SME inputs of from about 6-19 kWhr/T, more preferably from about 10-16 kWhr/T; slow-sinking fish feeds at SME inputs of from about 8-30 kWhr/T, more preferably from about 12-21 kWhr/T; and fast-sinking fish feeds and shrimp feeds at SME inputs of from about 6-19 kWhr/T, more prefbarrel of from about 100-1000 psi, more preferably from about 400-800 psi. In such processing the material may be cooked (as measured by extent of gelatinization of starch-bearing ingredients) to any desired level, but usually cook levels of at least about 75%, more preferably from about 75-98% are achieved.

Preferred Preconditioner

Turning next to FIGS. 8-9, a preferred preconditioner 90 is depicted. This preconditioner is fully illustrated and described in US Patent Publication No. 2008/0094939, incorporated by reference herein. Broadly, the preconditioner 90 includes an elongated mixing vessel 92 with a pair of parallel, elongated, axially-extending mixing shafts 94 and 96 within and extending along the length thereof. The shafts 94, 96 are operably coupled with individual variable drive devices 98 and 100, the latter in turn connected with digital control device 102. The preconditioner 90 is positioned upstream of extruder 10, such that the output from the preconditioner is directed in to the outlet 22 of extruder barrel 12.

In more detail, the vessel 92 has an elongated, transversely arcuate sidewall 104 presenting a pair of elongated, juxtaposed, intercommunicated chambers 106 and 108, as well as a material inlet 110 and a material outlet 112. The chamber 108 has a larger cross-sectional area than the adjacent chamber 106. The sidewall 104 has access doors 114 and is also equipped with injection assemblies 116 for injection of water and/or steam into the confines of vessel 92 during use of the preconditioner, and a vapor outlet 118. The opposed ends of vessel 92 have end plates 120 and 122, as shown.

Each of the shafts 94, 96 extends the full length of the corresponding chambers 106, 108 along the center line thereof, and has a plurality of radially outwardly extending paddle-type mixing elements (not shown) which are designed to agitate and mix material fed to the preconditioner, and to convey the material from inlet 110 towards and out outlet 112. The mixing elements on each shaft 94, 96 are axially offset relative to the elements on the adjacent shaft. Moreover, the mixing elements are intercalated (i.e., the elements on shaft 94 extend into the cylindrical operational envelope presented by shaft 94 and the elements thereon, and vice versa). The mixing elements may be oriented substantially perpendicularly to the shafts 94, 96. In other embodiments, the mixing elements may be adjusted in both length and pitch, at the discretion of the user.

The drives 98 and 100 are in the illustrated embodiment identical in terms of hardware, and each includes a drive motor 124, a gear reducer 126, and coupling assembly 128 serving to interconnect the corresponding gear reducer 126 and motor 124 with a shaft 94 or 96. The drives 98 and 100 also preferably have variable frequency drives 130 which are designed to permit selective, individual rotation of the shafts 94, 96 in terms of speed and/or rotational direction independently of each other. In order to provide appropriate control for the drives 98 and 100, the drives 130 are each coupled between a corresponding motor 124 and a control device 132. The control device 132 may be a controller, processor, application specific integrated circuit (ASIC), or any other type of digital or analog device capable of executing logical instructions. The device may even be a personal or server computer such as those manufactured and sold by Dell, Compaq, Gateway, or any other computer manufacturer, network computers running Windows NT, Novel Netware, Unix, or any other network operating system. The drives 130 may be programmed as desired to achieve the ends of the invention, e.g., they may be configured for different rotational speed ranges, rotational directions and power ratings.

In preferred forms, the preconditioner 90 is supported on a weighing device in the form of a plurality of load cells 134, which are also operatively coupled with control device 132. The use of load cells 134 permits rapid, on-the-go variation in the retention time of material passing through vessel 92, as described in detail in U.S. Pat. No. 6,465,029, incorporated by reference herein.

The use of the preferred variable frequency drive mechanisms 98, 100 and control device 132 allow high-speed adjustments of the rotational speeds of the shafts 94, 96 to achieve desired preconditioning while avoiding any collisions between the intermeshed mixing elements supported on the shafts 94, 96. In general, the control device 132 and the coupled drives 130 communicate with each drive motor 124 to control the shaft speeds. Additionally, the shafts 94, 96 can be rotated in different or the same rotational directions at the discretion of the operator. Generally, the shaft 94 is rotated at a speed greater than that of the shaft 96.

Retention times for material passing through preconditioner 90 can be controlled manually by adjusting shaft speed and/or direction, or, more preferably, automatically through control device 132. Weight information from the load cells 134 is directed to control device 132, which in turn makes shaft speed and/or directional changes based upon a desired retention time.

The preconditioner 90 is commonly used for the processing of animal feed or human food materials, such as grains (e.g., wheat, corn, oats, soy), meat and meat by-products, and various additives (e.g., surfactants, vitamins, minerals, colorants). Where starch-bearing grains are processed, they are typically at least partially gelatinized during passage through the preconditioner. The preconditioner 10 is usually operated at temperatures of from about 100-212° F., residence times of from about 30 seconds-5 minutes, and at atmospheric or slightly above pressures.

The drive arrangement for the preconditioner 90 has the capability of rotating the shafts 94, 96 at infinitely variable speeds of up to about 1,000 rpm, more preferably from about 200-900 rpm. Moreover, the operational flexibility of operation inherent in the preconditioner design allows for greater levels of cook (i.e., starch gelatinization) as compared with similarly sized conventional preconditioners.

The following examples set forth the preferred apparatus and methods in accordance with the invention. It is to be understood, however, that these examples are provided by way of illustration and nothing therein should be taken as a limitation upon the overall scope of the invention.

EXAMPLE 1

In these illustrative tests, data from a previous run using a Wenger Magnum ST TX85 twin screw extruder was compared with the improved twin screw extruder of the invention, in the preparation of aquatic feeds. The TX85 extruder is of the type illustrated in FIGS. 10-11, whereas the extruder of the invention is illustrated in FIGS. 1-5. As can be seen, both extruders include shorter pitch sections located on opposite sides of longer pitch steam injection sections. In the case of the TX85, the injectors were located in perpendicular relationship to the longitudinal axes of the extruder screws, whereas in the improved extruder, the injectors were oriented at a 45° angle relative to the screw axes. Moreover, the twin screws of the TX85 had a close flighting-to-flighting gap of about 0.039 inches along the entire lengths thereof, and the longer pitch sections thereof had a significantly smaller flighting depth (measured from the outer surface of the flighting to the shaft) and a consequently smaller $S_D/R_D$.

In greater detail, the TX85 extruder 140 includes an elongated barrel 142 made up of four interconnected heads, namely a first inlet head 144, a second steam injection head 146, third head 148, and fourth cone nose head 150. The inlet head 144 has a material inlet 152, whereas the outlet 154 of fourth head 150 is covered by a restricted die 156. A pair of intermeshed extruder screws 158, 160 extend along the length of barrel 142 and are connected to appropriate drive mechanism (not shown) for co-rotation of the screws during operation of extruder 140. Referring to FIG. 11, it will be observed that the screws 158, 160 include, from inlet 152 to outlet 154, an inlet section, a short-pitch compression section 164, a longer pitch steam injection section 166, a second compression section 168, a variable pitch section 170, and a final, tapered cone nose section 172. The compression sections 164 and 168 cooperatively create a steam injection area 174 within barrel 142. Three steam injectors 176 are mounted on the barrel head 146 and communicate with area 174. These injectors 176 are oriented at a perpendicular angle relative to the longitudinal axes of the corresponding screws 158, 160.

The upstream preconditioner used with the TX85 was a standard dual-shaft Wenger DDC preconditioner of the type described in U.S. Pat. No. 4,752,139. The shaft within the small diameter housing section was rotated at a speed of 250 rpm, whereas the shaft within the large diameter housing section was rotated at 125 rpm.

The test (No. 1) using the TX85 extruder was carried out using a recipe made up of 40% by weight fish meal, 20% by weight soybean meal, 17% by weight corn gluten meal, 15% by weight wheat flour, and 8% by weight full fat soy meal. The apparatus included a conventional Wenger CDC preconditioner upstream of the inlet to the TX85. Further, an upright back pressure valve (BPV) of the type illustrated in U.S. Pat. No. 6,773,739 was located between the heads 148 and 150 of the extruder barrel; this BPV was not functional in the process, however, owing to the fact that it was maintained in an essentially full-open position and thus did not contribute any resistance to material flow or pressure buildup within the barrel.

The other test (No. 2) using the improved extruder of the invention was carried out using a recipe made up of 35% by weight wheat middlings, 17% by weight rice bran, 23% by weight wheat flour, 6% by weight fish meal, and 19% by weight full fat soybean meal. The apparatus included a preconditioner of the type depicted in FIGS. 8-9 hereof, with the small cylinder shaft being operated in reverse (counterclockwise as illustrated in FIG. 9) at 800 rpm and the large cylinder shaft operating forwardly (clockwise as illustrated in FIG. 9) at 50 rpm.

Although the equipment and some operational parameters used in tests 1 and 2 are somewhat different, the important fact is that the energy and moisture inputs in both tests are very similar, as are the retention times. For example, the different preconditioner speeds gave a small effect compared with the overall process conditions employed. Moreover, the BPV was operated at a 99% open position, meaning that the effect of the valve was insignificant.

The following Table 2 sets forth the results from this series of tests.

TABLE 2

| | RUN NUMBER | |
|---|---|---|
| | 1 | 2 |
| DRY RECIPE INFORMATION | | |
| Density (kg/m$^3$) | 557 | 608 |
| Feed Rate (kg/hr) | 1991 | 2000 |
| Feed Screw Speed (RPM) | 40 | 40 |
| PRECONDITIONING INFORMATION | | |
| Preconditioner Speed (RPM) | 125/250 | 50/800 |
| Steam Flow to Preconditioner (kg/hr) | 180 | 160 |
| [1]Steam Flow to Preconditioner (%) | 9 | 8 |
| Water Flow to Preconditioner (kg/hr) | 240 | 209 |
| [1]Water Flow to Preconditioner (%) | 12 | 14 |
| Weight in Preconditioner (kg) | 136 | 119 |
| Preconditioner Retention Time (min) | 3 | 2.63 |
| Preconditioner Discharge Temp (° C.) | 77 | 73 |
| Moisture Entering Extruder (% wb) | 24.16 | 26.4 |
| EXTRUSION INFORMATION | | |
| [2]$S_D/R_D$ | 1.574 | 2.351 |
| Size of Extruder Drive (kW) | 187.5 | 112.5 |
| Extruder Shaft Speed (RPM) | 600 | 425 |
| Extruder Motor Load (%) | 37 | 33.4 |
| Steam Flow to Extruder (kg/hr) | 119 | 120 |
| [1]Steam Flow to Extruder (%) | 6 | 6 |
| Water Flow to Extruder (kg/hr) | 40 | 0 |
| [3]Control/Temperature First Head (° C.) | 40/44 | — |
| [3]Control/Temperature Second Head (° C.) | 70/83 | — |
| [3]Control/Temperature Third Head (° C.) | 110/129 | — |
| [3]Control/Temperature Fourth Head (° C.) | 120/115 | — |
| Back Pressure Valve % Closed (%) | 99 | — |
| Specific Mechanical Energy (SME) (kWhr/T) | 29 | 12 |
| Specific Mechanical Energy (SME) (kJ/kg) | 102.6 | 43.2 |
| Steam Energy (STE) (kJ/kg) | 424.8 | 396 |
| Total Energy Input (SME + STE) | 527.4 | 439.2 |
| [4]Energy Costs ($/T) | 4.96 | 3.67 |
| FINAL PRODUCT INFORMATION | | |
| Extruder Discharge Moisture (% wb) | 24.07 | 25.62 |
| Extruder Discharge Density (kg/m$^3$) | 441 | 435 |

[1]Percentage values define the amount of added moisture (water or steam) based upon the total dry weight of the ingredients taken as 100% by weight.
[2]$S_D/R_D$ is the ratio of the outside diameter of the screws to the root diameters of the screws at the steam injection regions along the extruder barrel. This is a measure of screw volume.
[3]Temperature control involved injection of cold water or steam into the external jackets of the extruder barrel.
[4]Mechanical energy costs were assumed to be $18.06/million kJ, and steam energy costs of $7.32/million kJ.

These tests were conducted so as to compare the energy costs at the same level of steam injection to the extruder. That is, the conventional TX85 extruder could only be operated with a maximum 6% steam injection to the extruder. Accordingly, the improved extruder of the invention was operated at this same level of steam injection in order to compare the total energy costs. While the product densities were very similar in runs 1 and 2, the total energy costs for producing the respective products were significantly less in run 2.

EXAMPLE 2

In this set of tests, essentially the same extruder set-ups were employed, with no steam injection to the TX85 extruder, but with a maximum amount of steam injection to the improved extruder hereof. The TX85 equipment did not include a BPV.

The recipe used with the TX85 (No. 3) was a proprietary pet food recipe, whereas the recipe in the improved extruder (No. 4) was the same as that set forth in Example 1. The data collected in this set of runs is set forth in the following Table 3.

TABLE 3

| | RUN NUMBER | |
|---|---|---|
| | 3 | 4 |
| DRY RECIPE INFORMATION | | |
| Density (kg/m$^3$) | 551 | 608 |
| Feed Rate (kg/hr) | 1185 | 2000 |
| Feed Screw Speed (RPM) | 25 | 40 |
| PRECONDITIONING INFORMATION | | |
| Preconditioner Speed (RPM) | 125/250 | 50/800 |
| Steam Flow to Preconditioner (kg/hr) | 120 | 160 |
| Steam Flow to Preconditioner (%) | 10 | 8 |
| Water Flow to Preconditioner (kg/hr) | 125 | 280 |
| Water Flow to Preconditioner (%) | 10.5 | 14 |
| Weight in Preconditioner (kg) | 82 | 122 |
| Preconditioner Retention Time (min) | 3.37 | 2.69 |
| Preconditioner Discharge Temp (° C.) | 92 | 81 |
| Moisture Entering Extruder (% wb) | — | 25.02 |
| EXTRUSION INFORMATION | | |
| $S_D/R_D$ | 1.574 | 2.351 |
| Size of Extruder Drive (kW) | 187.5 | 112.5 |

TABLE 3-continued

| | RUN NUMBER | |
|---|---|---|
| | 3 | 4 |
| Extruder Shaft Speed (RPM) | 441 | 425 |
| Extruder Motor Load (%) | 89 | 26.2 |
| Steam Flow to Extruder (kg/hr) | 0 | 280 |
| Steam Flow to Extruder (%) | 0 | 14 |
| Water Flow to Extruder (kg/hr) | 90 | 0 |
| Water Flow to Extruder (%) | 7.6 | 0 |
| Control/Temperature First Head (° C.) | 50/58 | — |
| Control/Temperature Second Head (° C.) | 50/61 | — |
| Control/Temperature Third Head (° C.) | 50/91 | — |
| Control/Temperature Fourth Head (° C.) | 50/105 | — |
| Specific Mechanical Energy (SME) (kWhr/T) | 82.6 | 9.5 |
| Specific Mechanical Energy (SME) (kJ/kg) | 297.4 | 342 |
| Steam Energy (STE) (kJ/kg) | 288 | 619.2 |
| Total Energy Input (SME + STE) | 585.4 | 653 |
| Energy Costs ($/T) | 7.48 | 5.15 |
| FINAL PRODUCT INFORMATION | | |
| Extruder Discharge Moisture (% wb) | 20.73 | 24.76 |
| Extruder Discharge Density (kg/m³) | 318 | 294 |

These runs confirm that use of the improved extruder permits significantly greater steam injection into the barrel as compared with the prior design. These products were greatly expanded as compared to the products of Example 1, as evidenced by their lower densities. Nonetheless, the improved extruder gave such lighter products at much reduced costs.

EXAMPLE 3

In this example cat food products were prepared using the basic extruder assembly of FIGS. 1-5 and the preconditioner of FIGS. 8-9. The objective of these tests was to prepare a light density (320-350 g/l, or about 20-22 lb/ft³) cat food using less than 10 kWhr/T SME input with 12% by weight steam injection into the extruder barrel. The dry ingredient recipe was made up of 53% by weight corn, 22% by weight poultry meal, 15% by weight soybean meal, and 10% corn gluten meal. This recipe provided 32.6% by weight protein, 4.0% by weight starch, 34.9% by weight fat, and 2.9% by weight fiber. The results of this run are set forth in Table 4.

TABLE 4

| | Product Cat Food RUN NUMBER | | |
|---|---|---|---|
| | 5 | 6 | 7 |
| DRY RECIPE INFORMATION | | | |
| Density (kg/m) | 556 | 556 | 556 |
| Feed Rate (kg/hr) | 2000 | 2000 | 2000 |
| Feed Screw Speed (RPM) | 40 | 40 | 40 |
| PRECONDITIONING INFORMATION | | | |
| Preconditioning Speed (RPM) | 50/800 | 50/800 | 50/800 |
| Steam Flow to Preconditioner (kg/hr) | 166 | 166 | 166 |
| Steam Flow to Preconditioner (%) | 8.3 | 8.3 | 8.3 |
| Water Flow to Preconditioner (kg/hr) | 114 | 114 | 114 |
| Water Flow to Preconditioner (%) | 5.7 | 5.7 | 5.7 |
| Weight in Preconditioner (kg) | 120 | 120 | 120 |
| Preconditioner Retention Time (min) | 2.64 | 2.64 | 2.64 |
| Preconditioner Discharge Temp (° C.) | 83 | 83 | 83 |
| $S_D/R_D$ | 2.351 | 2.351 | 2.351 |
| Size of Extruder Drive (kW) | 112.5 | 112.5 | 112.5 |
| Extruder Shaft Speed (RPM) | 725 | 725 | 425 |

TABLE 4-continued

| | Product Cat Food RUN NUMBER | | |
|---|---|---|---|
| | 5 | 6 | 7 |
| Extruder Motor Load (%) | 15 | 18 | 20-21 |
| Steam Flow to Extruder (kg/hr) | 336 | 236 | — |
| Steam Flow to Extruder (%) | 16.8 | 11.8 | 11.9 |
| Water Flow to Extruder (kg/hr) | 0 | 0 | 0 |
| Water Flow to Extruder (%) | 0 | 0 | 2.3 |
| Specific Mechanical Energy (SME) (kWhr/T) | 8 | 10 | 11 |
| Specific Mechanical Energy (SME) (kJ/kg) | 28.8 | 36 | 39.6 |
| FINAL PRODUCT INFORMATION | | | |
| Extruder Discharge Moisture (% wb) | 19.62 | 18.40 | 22.39 |
| Dryer Discharge Density (kg/m³) | 303 | 318 | 307 |
| % Cook | 92.7 | 94.6 | 94.7 |

These tests confirm that high-quality, light-density cat food can be made at 8-11 kWhr/T SME input. Typical prior art cat foods require an SME input of 25-40 kWhr/T. The cook values obtained were very high and the moisture levels were somewhat lower than normal for extruded cat feeds.

EXAMPLE 4

In this example floating fish feed products were prepared using the preconditioner-extruder setup of Example 3. The objectives of these tests were to determine if a good-quality fish feed could be produced at very low SME inputs, and whether such feeds could be produced by removing a substantial part of the added water.

The dry ingredient recipe included 35% by weight wheat midlings, 17% by weight rice bran, 23% by weight wheat flour, 6% by weight fish meal, and 19% by weight soybean meal. The dry recipe provided 24.0% by weight protein, 3.0% by weight fat and 36.0% by weight starch. The results of this test are set forth in Table 5.

TABLE 5

| | Product Floating Fish Feed RUN NUMBER | |
|---|---|---|
| | 8 | 9 |
| DRY RECIPE INFORMATION | | |
| Density (kg/m) | 508 | 508 |
| Feed Rate (kg/hr) | 2000 | 2000 |
| Feed Screw Speed (RPM) | 40 | 40 |
| PRECONDITIONING INFORMATION | | |
| Preconditioning Speed (RPM) | 50/800 | 50/800 |
| Steam Flow to Preconditioner (kg/hr) | 154 | 154 |
| Steam Flow to Preconditioner (%) | 7.7 | 7.7 |
| Water Flow to Preconditioner (kg/hr) | 100 | 100 |
| Water Flow to Preconditioner (%) | 4.5 | 4.5 |
| Weight in Preconditioner (kg) | 120 | 120 |
| Preconditioner Retention Time (min) | 2.64 | 2.64 |
| Preconditioner Discharge Temp (° C.) | 73 | 73 |
| $S_D/R_D$ | 2.351 | 2.351 |
| Size of Extruder Drive (kW) | 112.5 | 112.5 |
| Extruder Shaft Speed (RPM) | 720 | 720 |
| Extruder Motor Load (%) | 23 | 20 |
| Steam Flow to Extruder (kg/hr) | 250 | 242 |
| Steam Flow to Extruder (%) | 4.5 | 3.8 |
| Water Flow to Extruder (kg/hr) | 0 | 0 |
| Specific Mechanical Energy (SME) (kWhr/T) | 12 | 10 |
| Specific Mechanical Energy (SME) (kJ/kg) | 43.2 | 36 |

TABLE 5-continued

|  | Product Floating Fish Feed RUN NUMBER | |
|---|---|---|
|  | 8 | 9 |
| FINAL PRODUCT INFORMATION | | |
| Extruder Discharge Moisture (% wb) | 21.58 | 22.46 |
| Extruder Discharge Density (kg/m³) | 384 | 422 |
| Dryer Discharge Density (kg/m³) | 366 | 392 |
| % Floating Product | 100 | 100 |

These tests confirmed that good floating fish feeds can be made using the extruder and processes of the invention, even with low cost feed ingredients such as rice bran and soybean meal. SME values as low as 10 kWhr/T were achieved. The extruder was operated at rates as high as four ton per hour while maintaining acceptable product quality. Consequently, only a 60 hp drive is required for such rates. Very importantly, it was still possible to inject 12% by weight steam into the extruder barrel at the four ton per hour dry feed rate, indicating that the longer pitch regions of the screws still provided enough free volume to accept the injected steam. The as-extruded moisture levels were at lower moisture levels for conventional feeds.

EXAMPLE 5

In this example a comparative test was run using a conventional TX85 Wenger extruder with a standard DDC preconditioner (Run 11), and alternately the preferred extruder/preconditioner of the present invention (Run 10). A cat food product of identical formulation was used in each test, made up of 53% by weight corn, 22% by weight poultry meal, 15% by weight soybean meal, and 10% by weight corn gluten meal. The data derived from these comparative runs is set forth in the following Table 6.

TABLE 6

|  | Product Cat Feed RUN NUMBER | |
|---|---|---|
|  | 10 | 11 |
| DRY RECIPE INFORMATION | | |
| Density (kg/m) | 621 | 621 |
| Feed Rate (kg/hr) | 2000 | 2000 |
| Feed Screw Speed (RPM) | 36 | 37 |
| PRECONDITIONING INFORMATION | | |
| Preconditioning Speed (RPM) | 50/800 | 125/250 |
| Steam Flow to Preconditioner (kg/hr) | 160 | 120 |
| Steam Flow to Preconditioner (%) | 8 | 6 |
| Water Flow to Preconditioner (kg/hr) | 136 | 280 |
| Water Flow to Preconditioner (%) | 6.8 | 14 |
| Weight in Preconditioner (kg) | 111 | 119 |
| Preconditioner Retention Time (min) | 2.90 | 3.1 |
| Preconditioner Discharge Temp (° C.) | 94 | 75 |
| $S_D/R_D$ | 2.351 | 1.574 |
| Size of Extruder Drive (kW) | 112.5 | 187.5 |
| Extruder Shaft Speed (RPM) | 700 | 726 |
| Extruder Motor Load (%) | 33 | 65 |
| Steam Flow to Extruder (kg/hr) | 273 | 55 |
| Steam Flow to Extruder (%) | 13.6 | 2.75 |
| Water Flow to Extruder (kg/hr) | 0 | 59 |
| Water Flow to Extruder (%) | 0 | 2.95 |
| Temperature First Head (° C.) | — | 90 |
| Temperature Second Head (° C.) | — | 139 |

TABLE 6-continued

|  | Product Cat Feed RUN NUMBER | |
|---|---|---|
|  | 10 | 11 |
| Temperature Third Head (° C.) | — | 114 |
| Temperature Fourth Head (° C.) | 97 | 126 |
| Final Head Pressure (psig) | 500 | 250 |
| Specific Mechanical Energy (SME) (kWhr/T) | 11.4 | 62.8 |
| Specific Mechanical Energy (SME) (kJ/kg) | 41.04 | 226 |
| Barrel Retention Time (sec.) | 7.25 | 7.0 |
| FINAL PRODUCT INFORMATION | | |
| Extruder Discharge Moisture (% wb) | 22.57 | 25.33 |
| Extruder Discharge Density (kg/m³) | 342 | 315 |
| Dryer Discharge Density (kg/m³) | 338 | 308 |
| % Cook | 93.5 | 83.6 |

As will be readily appreciated upon consideration of the data of Table 6, use of the preferred preconditioner significantly reduced SME by over a factor of five, while still giving a fully equivalent cat feed as produced using the conventional equipment. It is also noteworthy that the steam flow to the extruder in Run 10 was much increased as compared with the conventional equipment.

The comparative products produced in this example were analyzed using scanning electron micrographs (SEMs) and X-ray tomography. This study demonstrated that the microstructures of the conventional product and that produced using the preferred system of the invention were somewhat different. Generally, the product of the invention had somewhat thicker cell walls and smaller cells.

The comparative products were also subjected to a palatability feeding test using a Wilcoxon Signed Rank Test. Twenty male and female cats identified by ear tattoo and cage number were presented the test diets on an individual basis. Bowl placement was reversed daily and both bowls were presented for four hours. Two bowls, each containing approximately 100 gm of diet were offered once daily for two days. If one diet was completely consumed prior to the end of the four hours, both bowls were removed. Food consumption and first choice preference were recorded for each cat. The statistics applied were the Wilcoxon tests to establish non-parametric ranking of observed consumption differences and an analysis of variance in consumption. Individual t-tests were performed to determine the consumption preference of each cat. A Chi Square test was performed to establish the significance in first choice preference. The results of this palatability study demonstrated no significance differences in palatability between the comparative feed products. This was surprising, inasmuch as high SME inputs are generally necessary for the production of highly palatable feeds.

We claim:

1. A screw assembly for use in a twin-screw cooking extruder and comprising:
    first and second elongated, axially rotatable screws each having an elongated shaft with outwardly extending helical flighting along the length of each shaft, the flighting of each shaft being intermeshed with the flighting of the other shaft,
    said first and second screws being substantially coextensive in length,
    the flighting of each of the first and second shafts presenting a pair of axially spaced apart sections of short pitch length, and an intermediate section having a pitch length greater than the pitch lengths of either of said short pitch length sections, said intermediate section having an axial length greater than four times the length of each of said axially spaced apart sections, said screws having an $S_D/R_D$ ratio of from about 1.9-2.5, wherein $S_D$ is the outermost screw diameter of the flighting of said first and second shafts, and $R_D$ is the root diameter of said first and second shafts.

2. The screw assembly of claim 1, the flighting of said intermeshed intermediate sections having an axial gap distance there between of from about 0.1-0.4 inches.

3. The screw assembly of claim 2, said gap distance being from about 0.15-0.35 inches.

4. The screw assembly of claim 1, wherein said $S_D/R_D$ ratio is about 2.35.

5. The screw assembly of claim 1, wherein the ratio of the pitch length of said intermediate section to the pitch lengths of either of said first and second sections is from about 3-6.

6. The screw assembly of claim 1, said screw flighting oriented for co-rotation of the first and second screws.

7. The screw assembly of claim 1, the flighting of each of said first and second shafts having equal screw diameters.

8. The screw assembly of claim 1, the root diameters of said first and second shafts being the same.

9. The screw assembly of claim 1, the flighting of said first and second shafts being single flight.

10. The screw assembly of claim 1, wherein the opposed ends of said intermediate section abut said pair of short pitch length sections.

* * * * *